(12) United States Patent  (10) Patent No.: US 8,438,287 B2
Liu et al.  (45) Date of Patent: May 7, 2013

(54) SYSTEM AND METHOD FOR MANAGEMENT OF MOBILE DEVICE

(75) Inventors: Dongmin Liu, Libertyville, IL (US);
Tom Schirtzinger, Fontana, WI (US);
Judy Ma, Long Grove, IL (US); Minh Quan Phan Huy, Round Lake, IL (US);
Chris Gremo, McHenry, IL (US);
Sambhavi Jayavelan, Round Lake Beach, IL (US); Ashish Dore, Round Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 616 days.

(21) Appl. No.: 12/620,247

(22) Filed: Nov. 17, 2009

(65) Prior Publication Data

US 2011/0119600 A1  May 19, 2011

(51) Int. Cl.
*G06F 15/16* (2006.01)
(52) U.S. Cl.
USPC .......................................... 709/227; 715/760
(58) Field of Classification Search .................. 709/227; 715/760
See application file for complete search history.

(56) References Cited

U.S. PATENT DOCUMENTS

| | | | |
|---|---|---|---|
| 7,142,110 | B2 | 11/2006 | Schmidtberg et al. |
| 8,136,085 | B2 * | 3/2012 | Skillman et al. .............. 717/100 |
| 2005/0010656 | A1 * | 1/2005 | Lee ............................... 709/223 |
| 2006/0080404 | A1 * | 4/2006 | Haber-Land-Schlosser et al. ............................. 709/218 |
| 2006/0085499 | A1 * | 4/2006 | Zhu .............................. 709/203 |
| 2009/0113080 | A1 | 4/2009 | Sperling |
| 2009/0193155 | A1 * | 7/2009 | Skillman et al. ................. 710/14 |
| 2009/0323673 | A1 * | 12/2009 | Gabbay et al. ................. 370/352 |
| 2010/0185736 | A1 * | 7/2010 | Jayaraman ..................... 709/206 |
| 2011/0179204 | A1 * | 7/2011 | Hulbert et al. .................. 710/74 |

FOREIGN PATENT DOCUMENTS

GB  2423895 A  9/2006

OTHER PUBLICATIONS

Nokia, Mobile Web Server: Technology White Paper; Version 1; May 29, 2007; 9 pages.
Wikman, J.; Dosa, F.; Tarkiainen, M.; Nokia, Research Center, NRC-TR-2006-004; Personal Website on a Mobile Phone; May 24, 2006; 6 pages.
Tutorial: Live Internet Application; Mikz Newsletters, Jan. 1, 2009; 2 pages.
Weigold, T., et al.; The Zurich Trusted Information Channel—An Efficient Defence Against Man-in-the-Middle and Malicious Software Attacks; Mar. 11, 2008; 18 pages.
Lu, H.K. et al.; A New Secure Communication Framework for Smart Cards; Jan. 10, 2009; 6 pages.

(Continued)

*Primary Examiner* — Brian P Whipple (57) ABSTRACT

Described is a system and method for managing a mobile device by using a user device, wherein the mobile device includes a web server and one or more web pages including a home web page that is accessible via an assigned uniform resource locator (URL). The method includes establishing a local connection between the mobile device and the user device, and detecting the established local connection by the user device. The method further includes launching a web browser of the user device when the local connection is detected using an auto-launch application to access the home web page via the assigned URL using a hypertext transfer protocol (HTTP) request, and providing the home web page to the web browser by the web server in response to the HTTP request, wherein the home web page provides access to the mobile device and facilitates management of the mobile device.

14 Claims, 10 Drawing Sheets

OTHER PUBLICATIONS

Knichale, A.; httpd4mobile Benutzeranleitung Version 1.0; Apr. 9, 2007; 20 pages.
Wikman, J. et al.; Providing HTTP Access to Web Servers Running on Mobile Phones; May 24, 2006; 6 pages.
Wikman, J. et al.; Personal Website on a Mobile Phone, Internet Citation, May 24, 2006; 6 pages.
Kumar, M.; Mikz—How different is it from httpd4mobile and mymobilesite?; Mukul Kumar's Blog, Mar. 5, 2009; 4 pages.
PCT/US2010/051899; PCT Notification of Transmittal of the International Search Report and The Written Opinion of the International Searching Authority; Feb. 22, 2011; 13 pages.

* cited by examiner

SYSTEM AND METHOD FOR MANAGEMENT OF MOBILE DEVICE

CROSS-REFERENCE TO RELATED APPLICATIONS

Statement Regarding Federally Sponsored Research or Development

FIELD OF THE INVENTION

The present invention relates generally to a mobile device and, more particularly, to a system and method for managing content or operation of a mobile device.

BACKGROUND OF THE INVENTION

Mobile wireless communication devices such as cellular telephones, smart phones, and other handheld and portable devices have become extremely widespread and often include many features and capabilities beyond those associated with mere voice communication. Such features can include e-mail messaging, text messaging, audio players, cameras, video games, Internet browsers, and so on. As more features are added to these devices, the efficient and effective use of these features of the mobile device becomes an issue. Further, as more features are added, more content is generated to be stored on the mobile device, including content such as a call log, a contact list, a calendar, a notes section, task information, text messages, email messages, and photographs, audio, and video media files. The efficient and effective use of the mobile device also requires that this digital content be managed in some way. Further, it is often desirable that much of this content be backed up and/or synchronized between the mobile device, a personal computer, and perhaps one or more Internet storage sites.

One prior art method for managing the content of a mobile device involves the use of a content management software application that is resident on a personal computer. When the mobile device is connected to the personal computer, the software application accesses the desired content and provides the management tools to manage that content. However, such content management software applications are typically generic, often providing capabilities for many types and makes of mobile devices, and typically require software updates which may not be relevant to a particular type of mobile device owned by a user. Further, the use of such a software application requires that a connection be made with the particular personal computer on which it is loaded, precluding the use of other personal computers for management purposes.

Another method for managing the content of a mobile device involves the use of a content management software application that is resident on a remote server. Thus access to any content stored on the mobile device requires that a connection be established between the mobile device and the remote server, and this is problematic if no Internet connection is available, or if the connection is unable to handle a large amount of data in a reasonable time period. Further, a user may have privacy concerns regarding the downloading and storage of personal digital content at a remote server.

It is known to provide a mobile device with a web server, and allow access to the mobile device by a personal computer. However, currently such access requires a module in the mobile device to interface with a gateway server, which operates as a bridge to connect the personal computer and the phone via the Internet.

Therefore, an improved method for managing the content and/or operation of a mobile device which overcomes the above disadvantages would be beneficial.

BRIEF SUMMARY OF THE INVENTION

In at least some embodiments, the invention relates to a system for managing a mobile device, wherein the system includes a user device having a web browser, and a mobile device which includes an accessible web server and web pages for facilitating management of the mobile device. Establishment of a local connection between the user device and the mobile device results in the web browser of the user device being launched to access a home web page of the mobile device via the web server. The system leverages the advantages of a larger display screen and/or a larger keyboard of the user device to facilitate management of the content or operation of the mobile device in an efficient and user-friendly manner In at least some embodiments, the present invention relates to a method for managing a mobile device by using a user device, wherein the mobile device includes a web server and one or more web pages including a home web page that is accessible via an assigned global uniform resource locator (URL). The method includes establishing a local connection between the mobile device and the user device, detecting the established local connection by the user device, and launching a web browser of the user device when the local connection is detected using an auto-launch application to access the home web page via the assigned URL using a hypertext transfer protocol (HTTP) request. The method further includes providing the home web page to the web browser by the web server in response to the HTTP request, wherein the home web page provides access to the mobile device and facilitates management of the mobile device.

BRIEF DESCRIPTION OF THE DRAWINGS

FIGS. 7(*a*)-7(*b*) and FIGS. 8(*a*)-(*b*) are exemplary methods for the system of FIG. 1.

DETAILED DESCRIPTION OF THE PREFERRED EMBODIMENT

Figure 1:
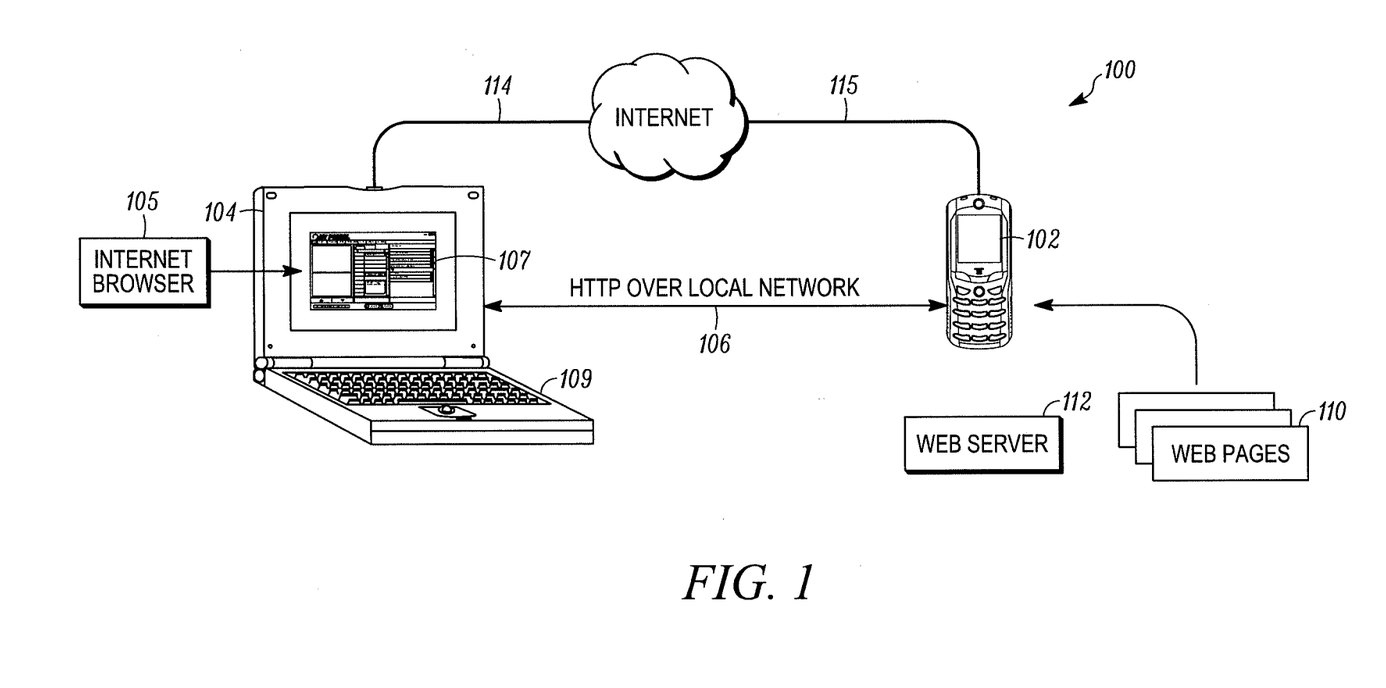
FIG. 1 is a schematic illustration of an exemplary system for managing the digital content and settings of a mobile device.

FIG. 1 is an illustration of a management system 100 showing a mobile device 102 (such as a wireless communication device) which can be placed in electronic communication with a user device 104 (such as a personal computer) via a local communication link 106. As a general overview, content or operation of the mobile device 102 can be managed using the user device 104 which displays one or more web pages 110 from the mobile device 102, which web pages 110 are served up by a web server 112 of the mobile device 102. The user device 104 includes a web browser 105 and a user interface including a display screen 107, a keyboard 109, and/or other user interface controls such as a mouse. The display screen 107 and keyboard 109 are preferably larger than corresponding elements of the mobile device. Notably, the user device 104 need not have stored thereon a content management application, because the mobile device 102 provides this functionality. Both the user device 104 and the mobile device 102 can independently be connected to the Internet via links 114, 115, but neither needs to be connected to accomplish management of content or operation of the mobile device 102 as described below.

The local communication link 106 is preferably a USB LAN (universal serial bus local area network) connection. However, the local communication link 106 can also be wireless and can be any of various Internet protocol (IP) enabled connections, such as WiFi, Bluetooth PAN (Personal Area Network) or a WAN (Wide Area Network) such as GPRS (General Packet Radio Service) or 3G (third generation) wireless communication protocol.

The user device 104 can take various forms, such as a personal computer or a game console, and includes a processor and memory capable of storing and running various applications. In particular, the web browser 105 can be any of a number of web browsers, such as Windows Internet Explorer, Mozilla Firefox, Apple Safari, Google Chrome, Opera, or the like. The user device 104 includes an auto-launch application for automatically launching an application such as the web browser 105 upon the detection of a locally connected mobile device, as more fully described below. The user device 104 also includes a local connectivity tool such as one or more USB drivers and a device interface having a local connection port such as a USB port for facilitating connection to the mobile device 102.

Figure 2:
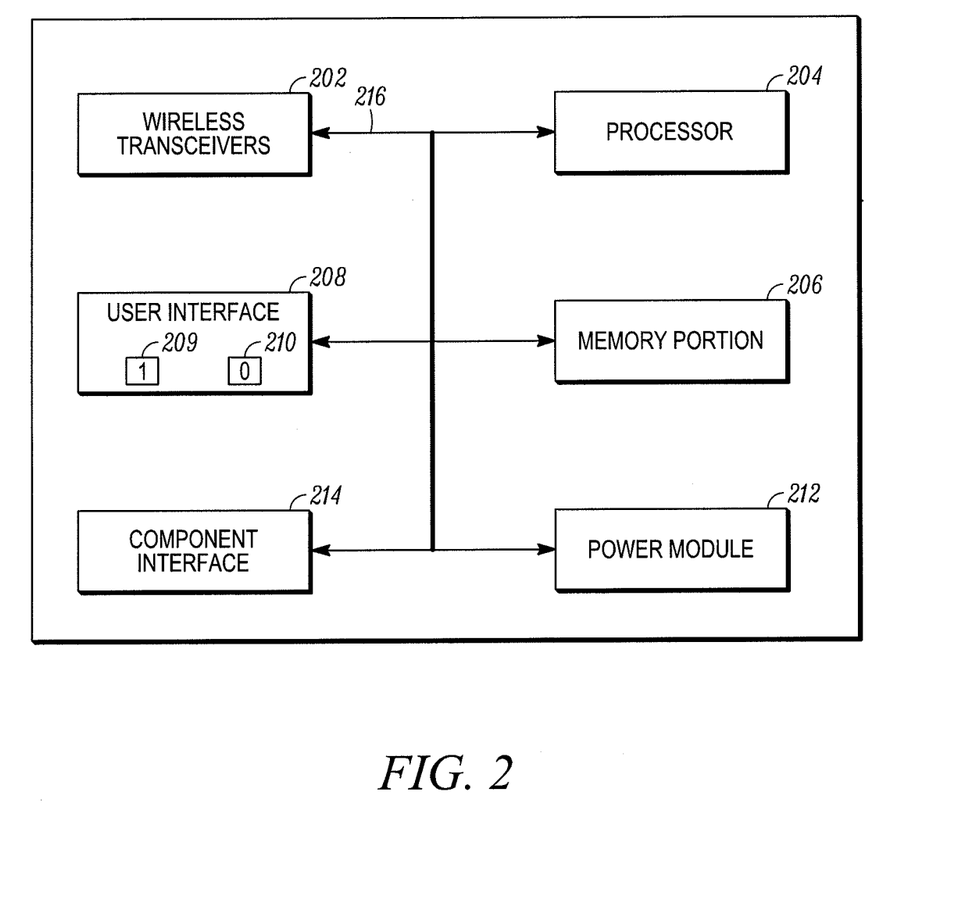
FIG. 2 is a block diagram of the exemplary mobile device of FIG. 1.

The mobile device 102 can also take various forms. Illustrated in FIG. 2 is a simplified block diagram of exemplary mobile device 102, which includes components such as one or more wireless transceivers 202, a processor 204 (e.g., a microprocessor, microcomputer, application-specific integrated circuit, etc.), a memory portion 206, a user interface 208 which includes one or more input devices 209 and one or more output devices 210, a power module 212, and a component interface 214. All of these components can be coupled to one another, and can be in communication with one another, by way of one or more internal communication links 216, such as an internal bus.

The input and output devices 209, 210 can each include a variety of visual, audio, and/or mechanical devices. For example, the input devices 209 can include a visual input device such as an optical sensor or camera, an audio input device such as a microphone, and a mechanical input device such as a keyboard, keypad, selection button, touchpad, touch screen, switch, or the like. Similarly, the output devices 210 can include a visual output device such as a liquid crystal display screen, one or more light emitting diode indicators, an audio output device such as a speaker, alarm and/or buzzer, and a mechanical output device such as a vibrating mechanism.

The memory portion 206 can encompass one or more memory devices of any of a variety of forms (e.g., read only memory, random access memory, static random access memory, dynamic random access memory, etc.) and can be used by the processor 204 to store and retrieve data. The data that is stored by the memory portion can include, but need not be limited to, operating systems, applications, and informational data. Each operating system includes executable code that controls basic functions of the communication device, such as interaction among the various components, communication with external devices via the wireless transceivers 202 and/or the component interface 214, and storage and retrieval of applications and data to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device, and can include stored digital content of the mobile device, such as associated calls, contacts, calendar, notes, and task information, text messages, email messages, and picture, audio, and video media files, etc.

Additionally, applications in the memory portion 206 include the web server 112 and one or more web pages 110, including a home web page, for accessing the content and facilitating the management of the content or operation of the mobile device in order to allow a user to read, create, edit, delete, organize or otherwise manage the content or to configure mobile device settings. The home web page has an associated assigned uniform resource locator (URL), and can include various sections and links to other of the web pages on the mobile device. The web server 112 is preferably a micro-web server that is responsive to hypertext transfer protocol (HTTP) requests to serve up requested web pages. Further, the web server is preferably implemented with the WebDAV protocol, which is an industry standard protocol that leverages web-based HTTP client/server requests to list, access, and modify files, and supports the use of WebDAV extension tools allowing a user to remotely edit and manage files on the mobile device via the user device, as described more below. The web server 112 is preferably enabled by default upon start-up of the mobile device, and can be enabled or disabled via input devices 209 of the user interface 208 of the mobile device. In one embodiment, the web server 112 can be enabled when the phone is placed in a predetermined mode such as a "Quick Tools" mode.

Other applications in the memory portion 206 include various application program interfaces (APIs), some of which provide links between the web server 112 and stored digital content. For example, a phone library application on a common gateway interface layer operates to provide a translation of contact data which is stored in one format to readable contact data appropriate for a user. Further, applications such as USB drivers or other device drivers can be included, as well as various installation applications.

The power module 212 preferably includes a power supply, such as a battery, for providing power to the other components while enabling the mobile device 102 to be portable, as well as circuitry providing for the battery to be recharged.

The component interface 214 provides a direct connection to other devices, auxiliary components, or accessories for additional or enhanced functionality, and in particular, can include a USB port for linking to a user device with a USB cable.

Each transceiver 202 can utilize a known wireless technology for communication. Exemplary operation of the wireless transceivers 202 in conjunction with other components of the mobile device 102 can take a variety of forms and can include, for example, operation in which, upon reception of wireless signals, the components of device 102 detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 210. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals to a remote device, such as a cell tower or a remote server (not shown).

In one embodiment, the auto-launch application and/or the local connectivity tool can be downloaded to the user device 104 from the mobile device 102 upon a first connection between the two devices, as further described below. In another case, these items can be downloaded via the Internet from a predetermined named website, such as one associated with the manufacturer of the mobile device 102. Further, the downloading process can be facilitated by leveraging a mechanism such as a standard Windows Update mechanism of a browser of the user device. In particular, upon the first connection, an auto-launch install application on the mobile device can operate to install a USB LAN driver and other standard PC drivers, an autoplay toolbar application, and a browser auto-launch application. The Windows Update process walks a user through several dialogs to install each driver and application. Subsequent connections will enable a user to access the content of the mobile device 102 immediately upon discovery of a connection. This is because with such applications, each connected device can have a default action specified which occurs upon discovery of that device type, or an automatic dialog can be displayed to query the user as to what action is to be taken.

Further, a CD-ROM emulation procedure can be used to install the auto-launch application and USB driver. Such a procedure can ensure a seamless download experience. In brief, in such a case, the mobile device can emulate a USB CD-ROM and automatically launch the driver installer and the auto-launch application. When the installation has been completed, the installed USB driver can switch the mobile device from the CD-ROM mode to a proprietary mode such as a USB LAN. At this point, the auto-launch application can take over.

As another example, the auto-launch application can be an autoplay application which is typically included as a feature of certain Windows and Vista operating systems. When the autoplay application is enabled, the user device 104 can detect when the mobile device 102 is connected such as via a USB LAN link. Upon detection, the autoplay application can search a root directory of the connected mobile device 102 for an autoplay instruction file having a standard autoplay filename (such as autorun.inf) and then can automatically execute the instructions in an existing autoplay instruction file. Therefore, in one embodiment, an autoplay instruction file on the mobile device 102 includes instructions to launch the web browser 105 with an HTTP request to access the home web page of the mobile device 102 with the assigned URL of the mobile device via the web server 112. These instructions can be associated with the mobile device 102 such that with subsequent connections, these instructions are automatically executed.

Additionally, the auto-launch application can be operable to examine the content of a connected device, determine the type of content, and then launch an appropriate application to play or display that type of content. For example, if such content includes pictures, music and/or video files, then the auto-launch application acts to launch a corresponding appropriate application to display the pictures, play the music, and/or play the video files. Each media type can have a set of registered handlers which play or display that type of media.

As mentioned, the mobile device 102 includes one or more web pages 110 which can be served up by the web server 112 in response to HTTP requests and displayed on the display screen 107 of the user device 104. These web pages 110 allow access to the stored digital content for facilitating its management and can also provide other useful information to the user of the mobile device, as described below.

Figure 3:
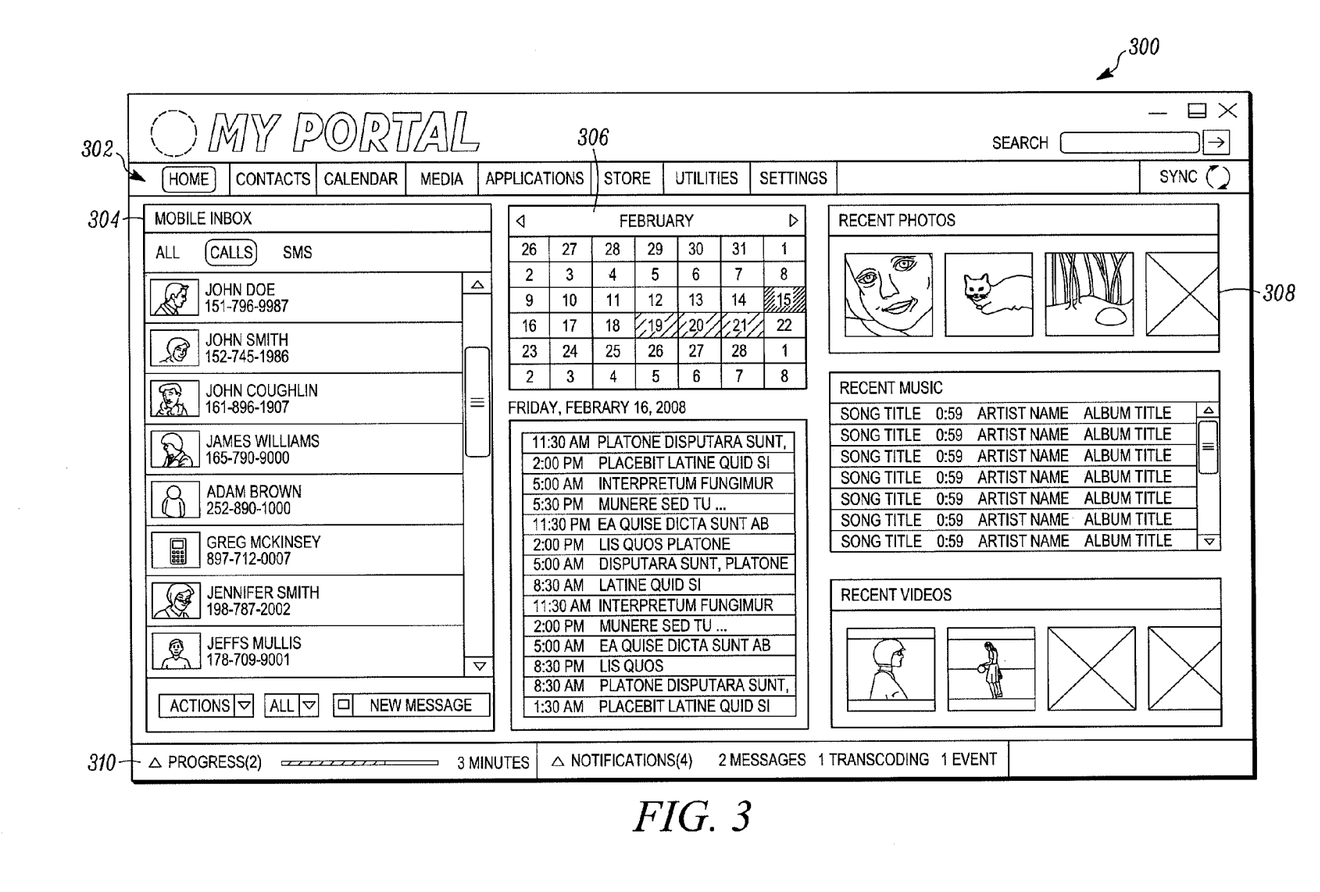
FIG. 3 is a schematic diagram of an exemplary home web page of the mobile device of FIG. 1.

For example, an exemplary home page 300 displayed on the display screen of the user device can be as illustrated in FIG. 3, and can include a selector section 302, a mobile inbox section 304, a calendar section 306, a media section 308, and a status section 310. This home page displayed on a larger display screen of the user device 104 is advantageous because more information can be presented in a different fashion as compared to a home screen of a typical mobile device 102. The home page can be designed to have fewer layers of hierarchical menus, and content or control items can be labeled in a more descriptive or informative way (which may not be possible on the limited space of the mobile device's display), so that these items can be located in a more straightforward and user-friendly manner as compared to finding them on the mobile device. Further, a larger keyboard and/or mouse of the user device 104 can be advantageous for facilitating interaction with the various menus, options, and items in an efficient manner.

With respect to the various sections on the home page 300, the selector section 302 can include various tabs such as Home, Contacts, Calendar, Media, Applications, Store, and Settings. When a tab is selected such as by clicking on it with a mouse, a corresponding web page can then be displayed.

The mobile inbox section 304 can display various items such as incoming and outgoing calls, voicemail messages, text messages, and e-mail messages, each with associated times and contact information such as names, phone numbers, and associated photos. The mobile inbox can allow for aggregation of items into displayable groups according to such categories as incoming, outgoing, and draft, and/or can allow for aggregation into displayable groups which are organized according to type of communication (calls, voice messages, text messages, email message, etc). These organizational features provide a user an easy way to select, read, prepare, organize, and/or delete messages.

The calendar section 306 can display a calendar and a task list, each with corresponding entries that can be selected, created, edited, and deleted. The media section 308 can display recent photos, recent music, and recent videos. The status section 310 can include various indicators for indicating information associated with the mobile device, such as signal strength, battery level, and memory usage, as well as event indicators or notifications for missed calls, new text messages, e-mails, and voicemails.

Figure 4:
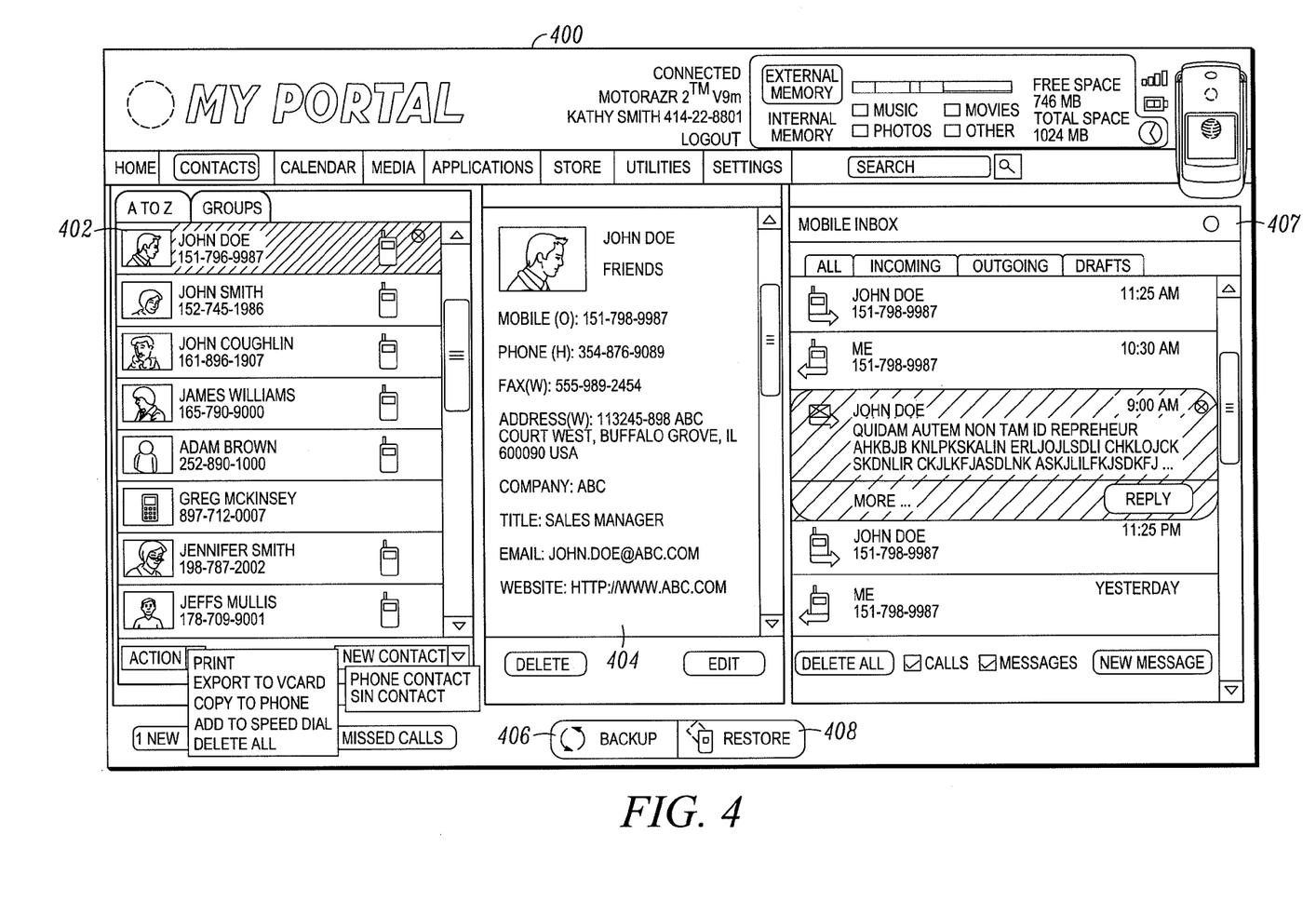
FIGS. 4-6 show various web pages of the mobile device of FIG. 1.

From the home web page 300, links are provided to other web pages. For example, as illustrated in FIG. 4, a contacts web page 400 can be linked to, which can include a section 402 to display an alphabetical list of or groups of contacts, wherein each contact has one or more associated phone numbers, address information, and an associated photograph and ringtone. Further, a section 404 to display a selected contact in detail can also be provided, along with a mobile inbox section 407 such as described above. The contacts web page 400 allows for individual contact items to be deleted, edited, added, restored or copied, such as in a V-card format from another source. Back up and restore buttons 406, 408 can be used to back up contacts to the user device, and to restore contacts stored on a user device 104 to the mobile device 102.

Figure 5:
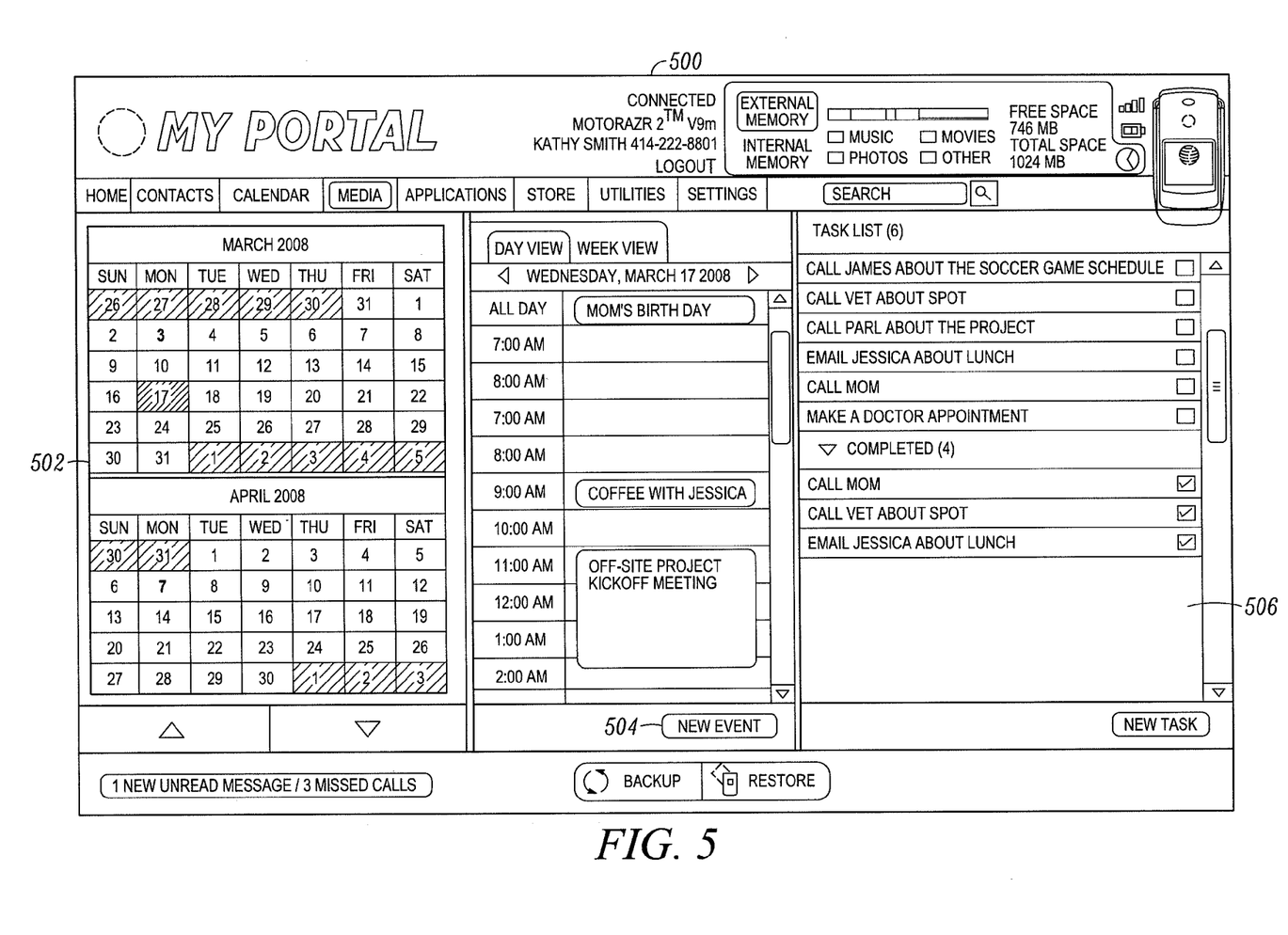

A calendar web page 500, such as that illustrated in FIG. 5, can include a section 502 to display one or more months, with selectable days or weeks to be displayed in another section 504, along with a section 506 to display a task list.

Figure 6:
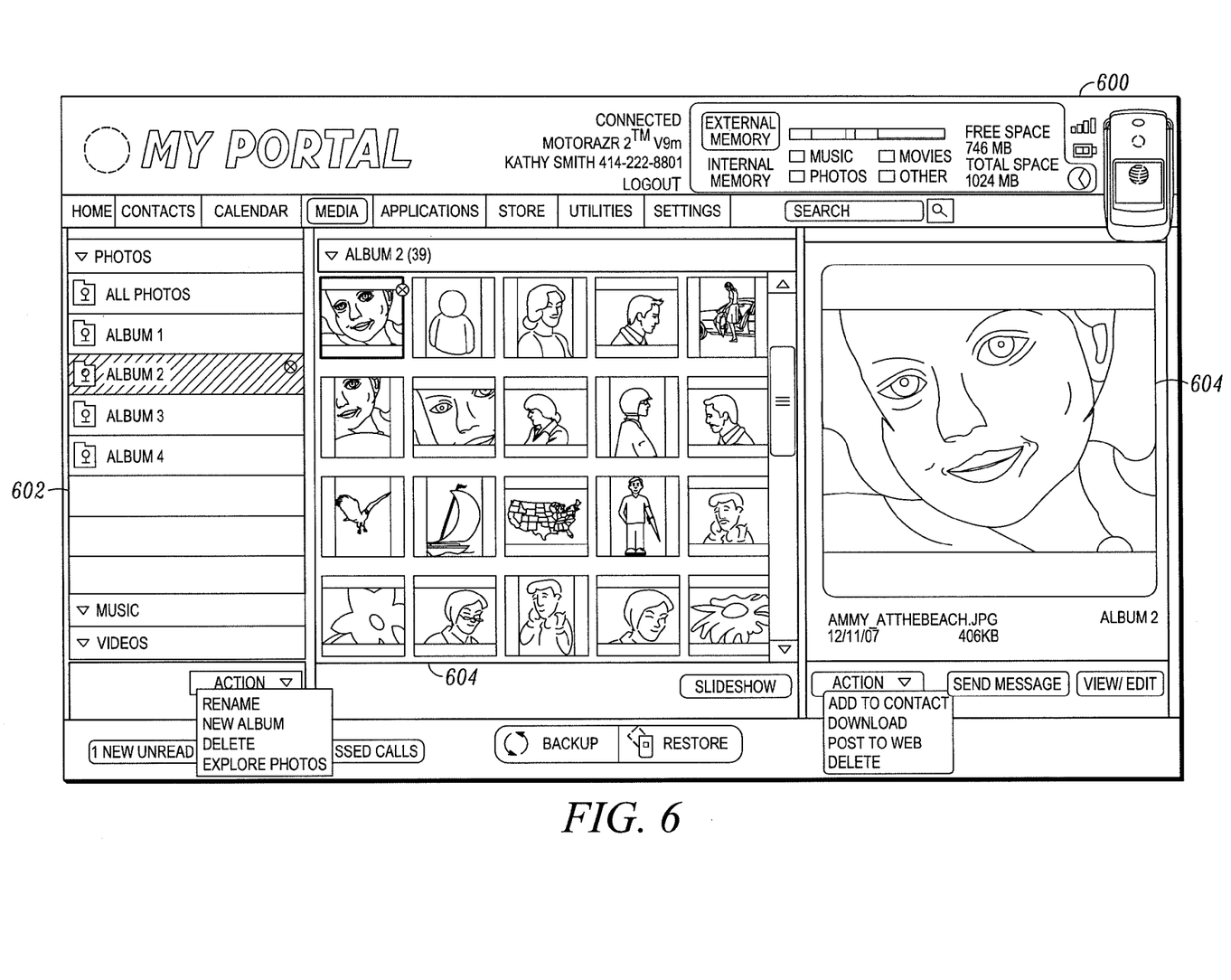

A media web page 600, such as shown in FIG. 6, allows various media files to be listed, grouped, accessed and managed. For example, a photo listing section 602 can be provided to manage photos in albums. Various thumbnails of photos can be provided in a display area 604 and these photos can be played as a slide show. Another section 604 provides a larger display of a selected photo.

As mentioned, the WebDAV protocol leverages web-based HTTP client/sever requests to allow a user to list, access, and modify files. This protocol is supported by Internet Explorer, Windows operating systems, Mac OSX, and others. For example, a user device with a Windows web browser leverages Windows drag and drop WebDAV features such that a user can be presented with a standard Window Explorer file browser window (similar to what is seen on a personal computer when a user clicks on the "C:" drive or a network mapped drive in "My Computer"). This feature allows users to easily drag and drop files to and from the mobile device, or organize various files, such as to create and edit playlists, rename files, associate photos and ring tones with various contacts, etc. Also, photographs can be browsed, edited (using simple crop, rotate, and delete commands), placed in various folders or albums, played as a slideshow, posted to the web, or sent with email messages. Similarly, videos can be browsed, played, and communicated.

A store web page (not shown) can be used to advertise products, accessories, and services for the mobile device. Either the user device 104 or the mobile device 102 can be connected to the Internet, and different methods can be used to then link to web based content. For example, the mobile device can connect to the Internet, and simple buttons and links can be provided to open various web pages in new browser windows. A storefront web page can be used to enable a user to directly download content and applications to the mobile device 102.

A settings web page (not shown) can be used to present information to the user in an organized, user-friendly manner and allow a user to initialize or adjust various settings. For example, in one embodiment, various tabs can be displayed including Initialization, Personalization, Connectivity and Services, and Other. Using the initialization tab, settings critical to initial operation and set up of a mobile device can be displayed, including such items as device name, access code, time zone, etc. Using the personalization tab, settings which help a user to personalize his or her mobile device can be displayed, including ringtones, graphical images, wallpaper, themes, etc, along with a contacts list. Under the connectivity and services, various other settings can be displayed, including Bluetooth, WiFi, SMS, MMS, browser, and other options which can be managed. The Other tab can include items such as call timers, parental notifications, alarms, and the like. The settings web page allows a user to input various settings in order to quickly and easily initialize or personalize one's mobile device.

Figures 7, 7A:
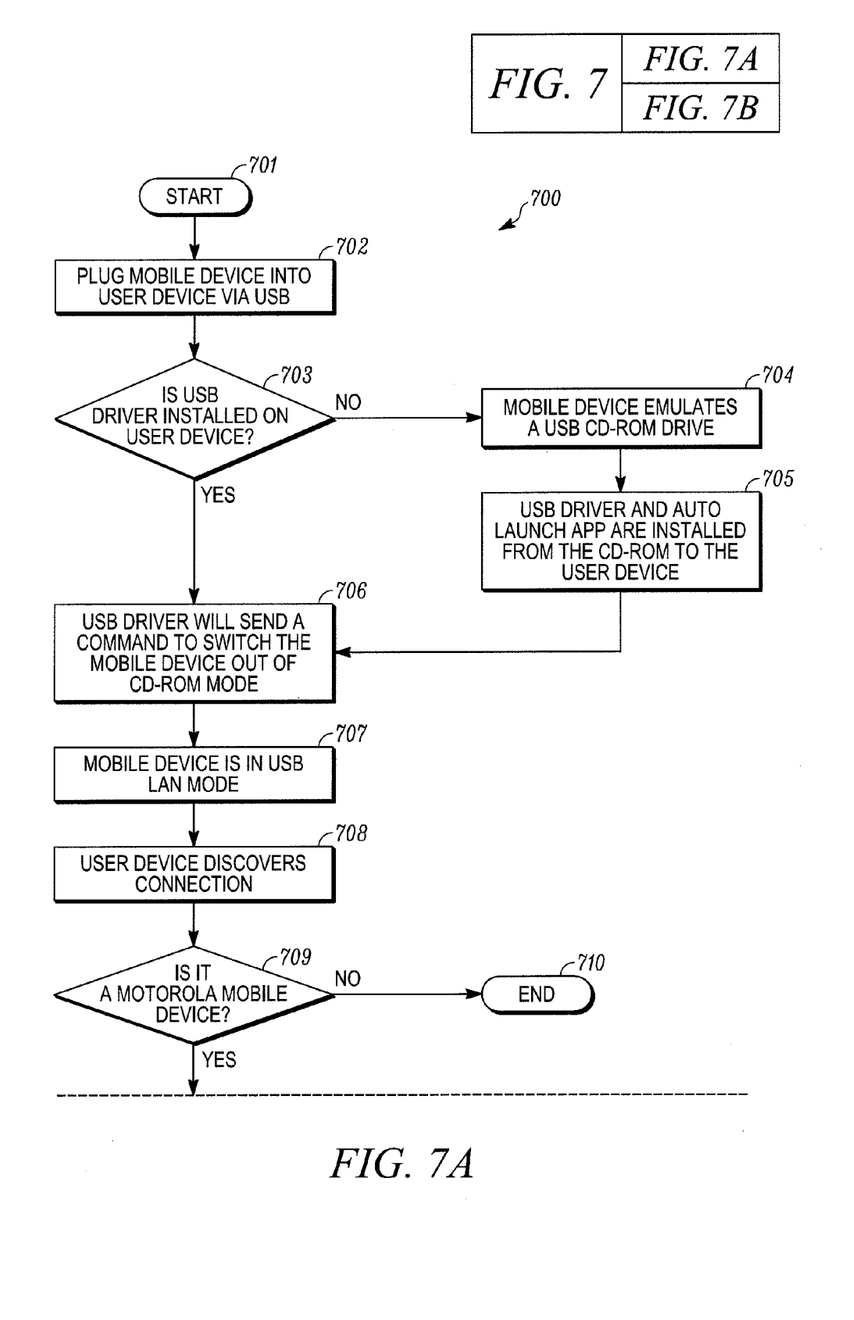
Figure 7B:
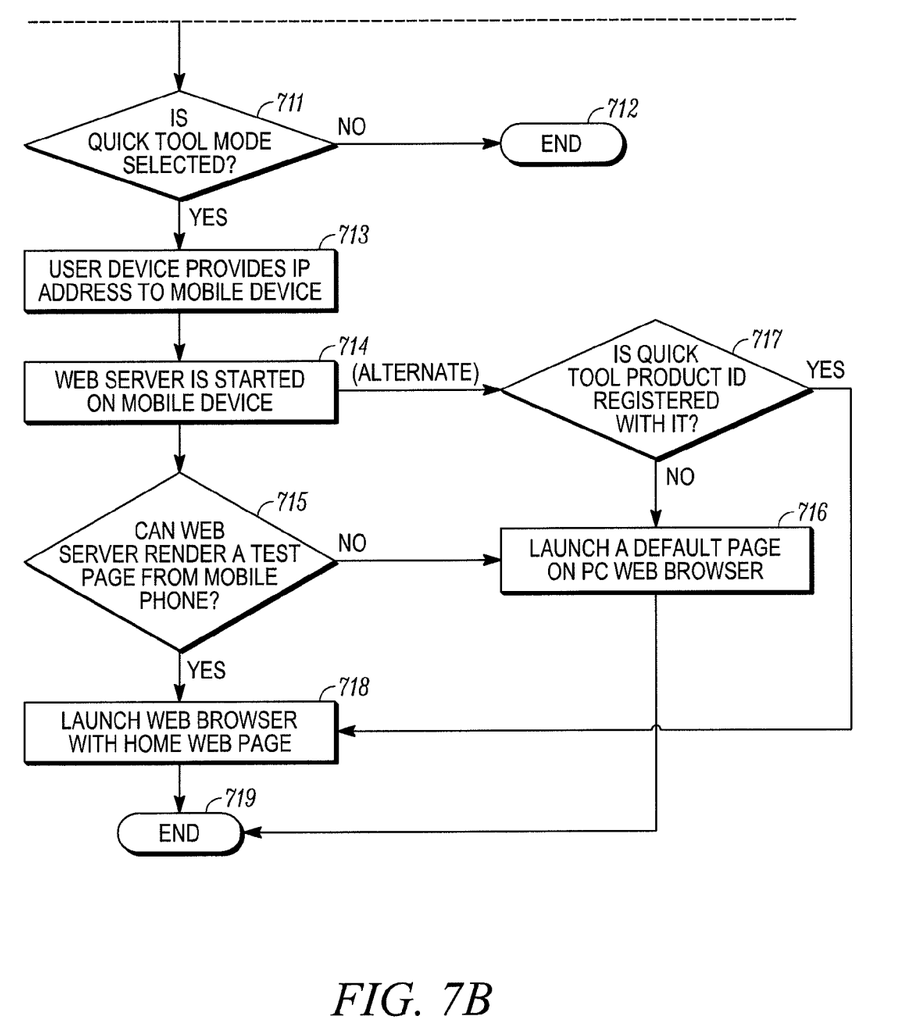

The operation of the management system 100 can be explained with respect to FIGS. 7(*a*) and (*b*), which together illustrate an exemplary method 700 for the system 100. The method 700 begins at a step 701. At a step 702, the mobile device is connected to the user device using a USB cable. At a step 703, it is determined whether a USB driver is already installed on the user device. If so, then processing proceeds to a step 706. If not, then processing proceeds to a step 704. At step 704, the mobile device emulates a USB CD-ROM drive, and at a step 705, the mobile device downloads a USB driver and an auto launch application as if from a CD-ROM to the user device.

At step 706, the USB driver on the user device will send a command to switch the mobile device out of CD-ROM emulation mode, and at a step 707, the mobile device is placed in a USB LAN mode, such as called "Quick Tool".

At a step 708, the user device discovers the local connection. At a step 709, the auto-launch application checks if it is a particular type of mobile device. If not, at step 710 the process is terminated, and if it is a particular type of mobile device, such as one from a particular manufacturer (Motorola), the process proceeds to a step 711. At step 711, the application determines whether the Quick Tool mode is enabled. If not, at step 712 the process is terminated, and if it is, the process proceeds to a step 713. At step 713, the user device provides the assigned URL (IP address) to the mobile device. At a step 714, the web server is started on the mobile device.

At a step 715, the auto-launch application tests if the mobile device can render a test page, or at a step 717, the auto-launch application tests if the mobile device "Quick Tool" product ID is registered with it. In either case, if not, at step 716 a default non-personalized page is launched on the web browser of the user device, and the process ends at a step 719. If yes, then at a step 718, the auto-launch application launches the web browser with a mobile device-side hosted home web page, which presents a phone tools suite such as described above, and the process ends at step 719.

Figures 8, 8A:
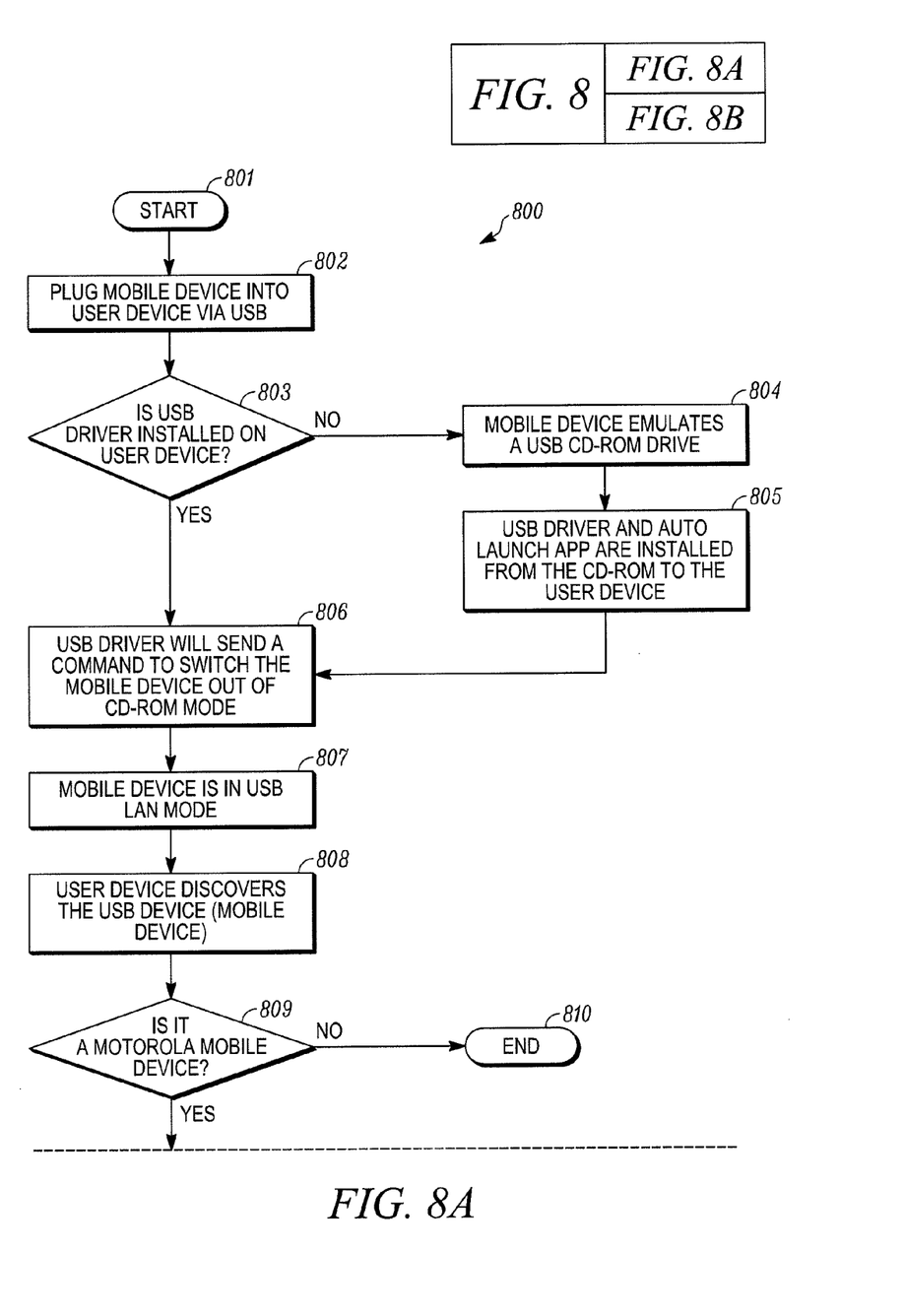
Figure 8B:
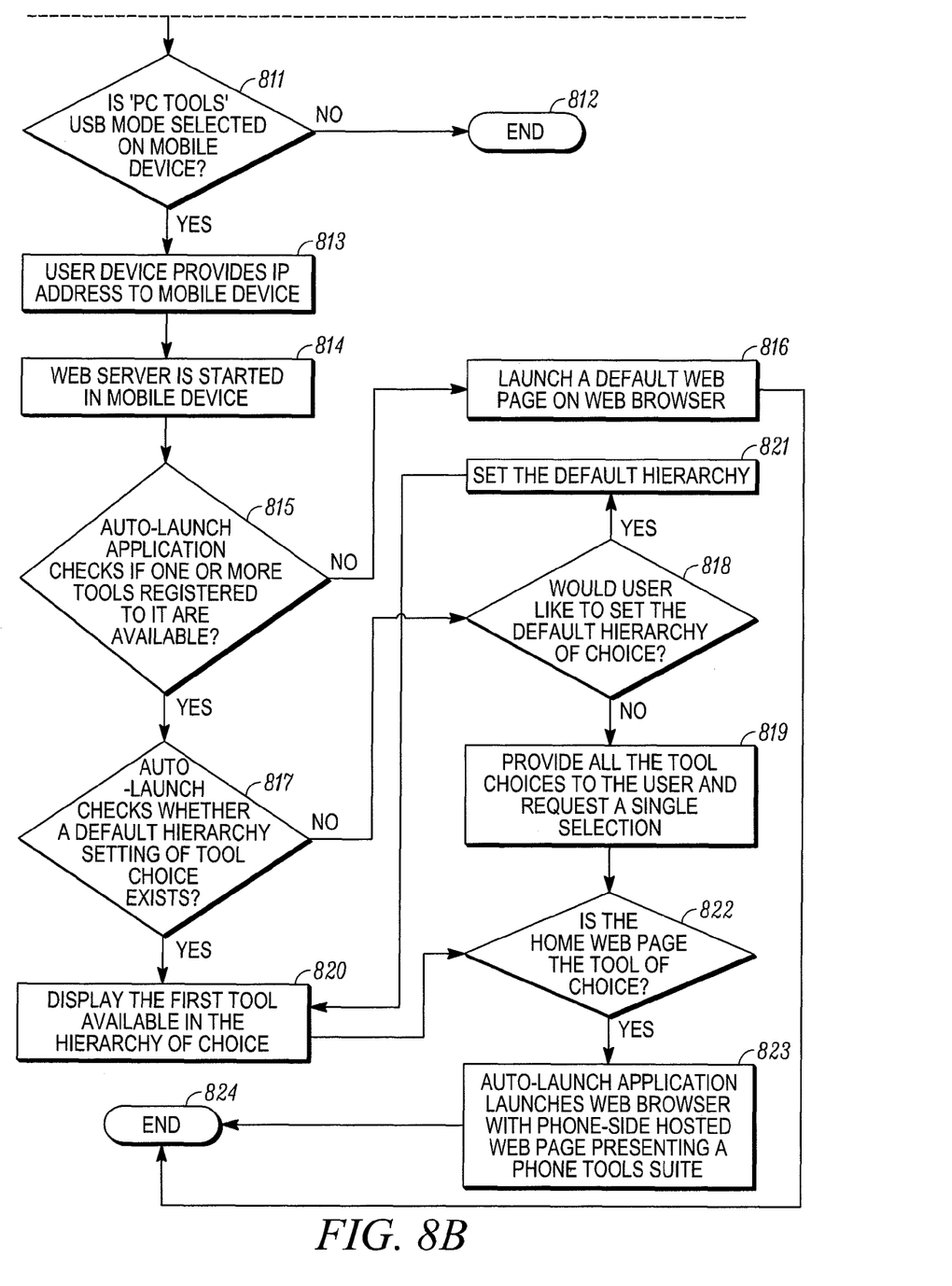

Similarly, FIGS. 8(*a*) and (*b*) illustrate another method 800 for the system 100, which begins at a step 801. Here it is assumed that both the user device and the mobile device support a USB composite mode, and the mobile device includes a USB composite mode called "PC tools" which is enabled. An auto-launch application which allows other applications like NGP (Next Generation Tools) and WMP (Windows Media Player) to be registered with it can be downloaded from the mobile device to the user device.

At a step 802, the mobile device is connected to the user device using a USB cable. At a step 803, it is determined whether a USB driver and auto-launch application is already installed on the user device. If so, then processing proceeds to a step 806. If not, then processing proceeds to a step 804. At step 804, the mobile device emulates a USB CD-ROM drive, and at a step 805, the mobile device downloads a USB driver and an auto launch application as if from a CD-ROM to the user device.

At step 806, the USB driver on the user device will send a command to switch the mobile device out of CD-ROM emulation mode, and at a step 807, the mobile device is placed in a USB LAN mode, such as called "Quick Tool".

At a step 808, the user device discovers the local connection. At a step 804, the auto-launch application checks if the user device is a particular type of mobile device, such as one from a particular manufacturer. If not, at step 805 the process is terminated, and if it is, the process proceeds to a step 806.

At step 806, the auto-launch application determines whether the PC tools mode is enabled. If not, at step 807 the process is terminated, and if it is, the process proceeds to a step 808. At step 808, the user device provides the assigned URL (IP address) to the mobile device. At a step 809, the web server is started on the mobile device. At a step 810, the auto-launch application determines if one or more tools are registered to it. If not, processing proceeds to a step 811, and if so, processing proceeds to a step 812.

At step 811, a default web page is launched on the web browser of the user device, and then the process ends at 820. At step 812, the auto-launch application checks whether a default hierarchy setting of tool choices exists. If not, processing proceeds to a step 813, and if so, processing proceeds to a step 815. At step 813, it is determined if a user would like to set the default hierarchy of choice. If not, processing proceeds to a step 814, and if so, processing proceeds to a step 816, wherein the default hierarchy is set, and then processing proceeds to step 815.

At step 815, the first tool available in the hierarchy of choice is displayed, and processing then proceeds to a step 817. At step 814, the tool choices are presented to the user for selection and processing then proceeds to step 817. At step 817, it is determined if the web server and home web page is the tool of choice. If yes, then at a step 819, the auto-launch application launches the web browser with a mobile device-side hosted home web page, which presents a phone tools suite as described above. The process ends at 820.

Once a home or default web page is launched, a user can use the user device 104 to manage the mobile device 102. Some advantages of this system 100 include the ability to manage the mobile device 102 using the web pages, a larger keyboard and a larger display of the user device 104. Each web page can display more information than is possible to display on the limited size display screen of a mobile device. A user can more efficiently manage the content and operation of the mobile device. Management of the mobile device can be achieved using a user device located at a hotel, an Internet café, or a friend's house because all the tools needed for accomplishing effective management of the content and operation of the mobile device can be stored on the mobile device. Further, the system 100 allows high throughput and security of data exchanged between the user device and the mobile device.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method for managing a mobile device by using a user device, wherein the mobile device includes a web server and one or more web pages including a home web page that is accessible via an assigned uniform resource locator (URL), the method comprising:
   establishing a local connection between the mobile device and the user device;
   initiating the mobile device to enter a CD-ROM emulation mode;
   detecting if a compatible device driver and an auto-launch application are installed on the user device;
   installing the compatible device driver and auto-launch application onto the user device if not detected;
   switching the mobile device from CD-ROM emulation mode to a proprietary mode; and
   initiating the auto-launch application to launch a web browser on the user device, wherein the web browser is directed by the auto-launch application to access the home web page of the mobile device via the assigned URL, provided by the auto-launch application, using a hypertext transfer protocol (HTTP) request, and
   wherein the home web page provides access to the mobile device and facilitates management of the mobile device.

2. The method of claim 1, further including downloading at least one of the auto-launch application, a local connectivity tool, and a toolbar application to the user device from one of the mobile device and a predetermined Internet web site.

3. The method of claim 2, wherein the downloading step is enabled by a standard Windows Update feature, 4. The method of claim 2, wherein the downloading step is enabled by a CD-ROM emulation procedure.

5. The method of claim 1, wherein the established local connection is a USB LAN (universal serial bus local area network) connection.

6. The method of claim 1, wherein the auto-launch application operates by searching the mobile device for an autoplay instruction file and executes one or more instructions in the autoplay instruction file upon finding the file.

7. The method of claim 1, further including managing the content or operation of the mobile device using the one or more web pages displayed on the web browser.

8. The method of claim 7, wherein the managing step includes dragging a file from a first location and dropping the file at a second location.

9. The method of claim 7, wherein the managing step includes dragging a media file from a first location and dropping the media file at a second location in order to associate a media file with a particular contact.

10. The method of claim 7, further including managing the operation of the mobile device using the one or more web pages displayed on the web browser to adjust one or more settings of the mobile device.

11. The method of claim 1, further including using the mobile device to link the user device to the Internet to allow desired web sites to he displayed on the web browser of the user device.

12. The method of claim 1, further including establishing an Internet connection for one of the user device and the mobile device to the Internet and downloading an application to the mobile device using the web browser of the user device.

13. A method for managing the content of a mobile device by using a user device, wherein the mobile device includes a web server and one or more web pages including a home web page that is accessible via an assigned uniform resource locator (URL), the method comprising:
   establishing a local connection between the mobile device and the user device;
   initiating the mobile device to enter a CD-ROM emulation mode;
   installing an auto-launch application on the user device;
   switching the mobile device from CD-ROM emulation mode to a proprietary mode; and
   initiating the auto-launch application to launch a web browser on the user device, wherein the web browser is directed by the auto-launch application to access the home web page of the mobile device via the assigned URL, provided by the auto-launch application, using a hypertext transfer protocol (IMP) request, and
   wherein the home web page provides access to the mobile device and facilitates management of the mobile device.

14. The method of claim 1, wherein the established local connection is a wireless connection.

* * * * *